United States Patent [19]

Repta et al.

[11] Patent Number: 5,390,272
[45] Date of Patent: Feb. 14, 1995

[54] FIBER OPTIC CABLE CONNECTOR WITH STRAIN RELIEF BOOT

[75] Inventors: Eric J. Repta, Schaumburg; Michael T. Mayszak, Carol Stream, both of Ill.; Donald W. Duda, Williams Bay, Wis.

[73] Assignee: Amphenol Corporation, Wallingford, Conn.

[21] Appl. No.: 113,698

[22] Filed: Aug. 31, 1993

[51] Int. Cl.⁶ .................................................. G02B 6/44
[52] U.S. Cl. ........................................ 385/100; 385/87
[58] Field of Search ............ 385/76, 86, 87, 100–113, 385/117, 118, 125, 147, 78

[56] References Cited

U.S. PATENT DOCUMENTS

| | | | |
|---|---|---|---|
| 2,724,736 | 2/1953 | Klumpp, Jr. | 174/153 |
| 4,826,277 | 5/1989 | Weber et al. | 385/100 |
| 4,834,487 | 5/1989 | Abendschein et al. | 350/96.2 |
| 5,030,135 | 7/1991 | Plesinger | 439/447 |
| 5,071,219 | 12/1991 | Yurtin et al. | 385/78 |
| 5,094,552 | 3/1992 | Monroe et al. | 385/76 |
| 5,138,678 | 8/1992 | Briggs | 385/86 |
| 5,151,962 | 9/1992 | Walker et al. | 385/86 |
| 5,170,452 | 12/1992 | Ott | 385/60 |
| 5,202,942 | 4/1993 | Collins et al. | 385/87 |
| 5,212,752 | 5/1993 | Stephenson et al. | 385/78 |

FOREIGN PATENT DOCUMENTS

| | | | |
|---|---|---|---|
| 3309996 | 9/1984 | Germany | 385/100 |
| WO9309457 | 5/1993 | United Kingdom | 385/100 |

*Primary Examiner*—Rodney B. Bovernick
*Assistant Examiner*—John Ngo
*Attorney, Agent, or Firm*—Bacon & Thomas

[57] ABSTRACT

A strain relief system for the backside of a fiber optic connector has a controlled bend radius defined by the formula $R = [(W+t)^2/2(1-\cos \phi)]^{\frac{1}{2}}$, where W is the rib thickness, t is the width of spaces between the ribs, and $\phi$ is an angle defined by corners of the ribs which engage each other at the minimum bending radius and a pivot point about which the ribs pivot relative to each other.

14 Claims, 4 Drawing Sheets

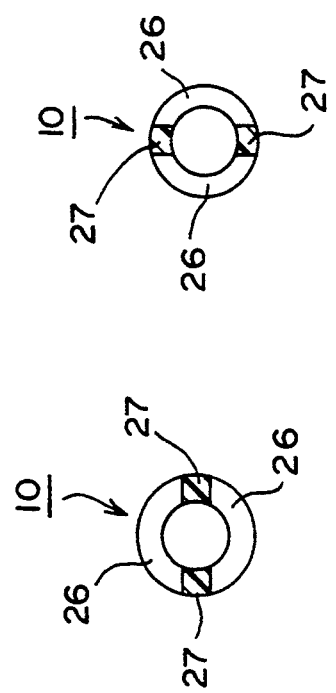
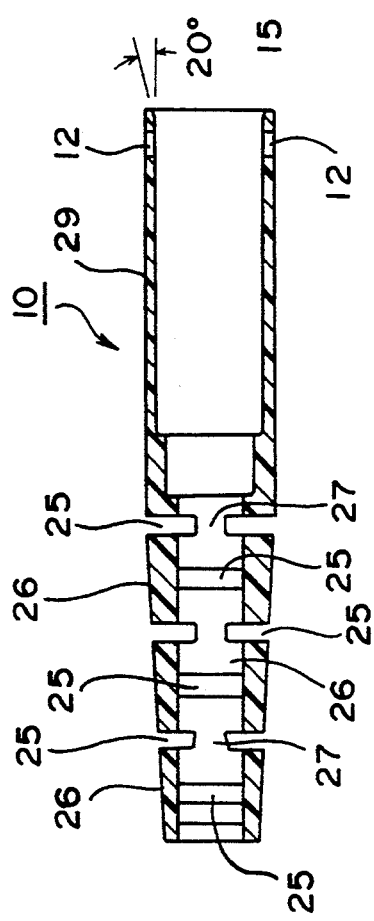
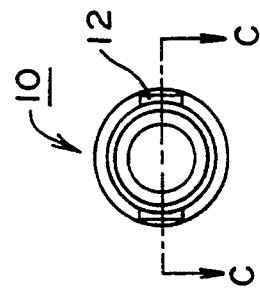
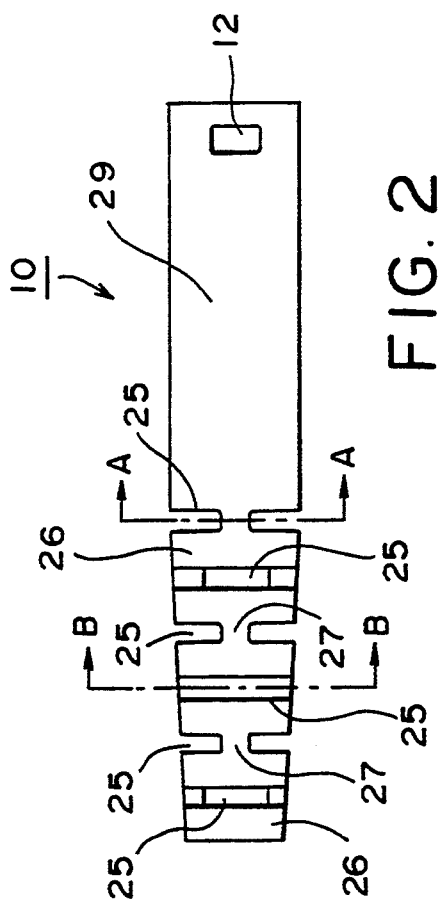

FIBER OPTIC CABLE CONNECTOR WITH STRAIN RELIEF BOOT

BACKGROUND OF THE INVENTION

1. Field of the Invention

This invention relates to a cable strain relief system, and in particular to a strain relief system for an optical fiber connector.

2. Description of Related Art

Optical fibers are used in a variety of applications ranging from large scale telephonic communication systems to laser surgery, and generally include a transparent core made, for example, of glass surrounded by cladding which is also made of transparent material but has a different index of refraction than the core. The core and cladding combined have a diameter of as little as 125 microns, and are enclosed by a protective flexible jacket having a diameter on the order of 3 mm. Connectors are used to join fibers to each other and to active or passive optical components such as sources, detectors, repeaters, switches, and attenuators.

As is the case with electrical connectors, the point at which the cable enters the connector is subject to excessive stresses when loads are placed on the cable. It is known to relieve the stresses by a strain relief system in the form of a flexible boot. Although the ability of state-of-the-art optical fiber cables to flex without affecting performance has been greatly enhanced recently, there remains a point of flexure beyond which the optical performance of any optical cable seriously degrades.

An ideal strain relief for an optical fiber cable would permit maximum flexibility to a minimum bending radius, within system tolerances, under loads of less than 1 lb. While strain relief systems for various types of cables currently exist which provide flexibility and possibly a minimum bending radius, none allows the optimum combination of maximum flexibility and a controllable minimum bending radius necessary to ensure optical performance of the optical fiber cable.

Examples of prior optical fiber connectors which include strain relief boots of varying degrees of apparent effectiveness are shown in U.S. Pat. Nos. 2,724,736; 4,834,487; 5,030,135; 5,071,219; 5,094,552; 5,138,678; 5,170,452; and 5,202,942. For the most part, these patents give scant attention to the strain relief boot, and none specifically addresses the issues raised below. In U.S. Pat. No. 4,834,487, for example, the only mention of a strain relief is the statement that a " . . . tubular strain relief boot is also shown." Similarly, U.S. Pat. No. 5,202,942 mentions an " . . . elongated, flexible strain relief body portion extending rearwardly therefrom and encircling the cable as known to those skilled in the art", while U.S. Pat. No. 5,138,678 mentions only a " . . . tubular, flexible portion of the strain relief." U.S. Pat. Nos. 5,170,452 and 5,071,219 similarly mention strain reliefs in passing, and do not show any concern for controlling the minimum bending radius while providing maximum flexibility under small loads.

U.S. Pat. Nos. 5,030,135 and 2,724,736 discuss particular strain relief designs, but approach the problem by offering resistance to bending, rather than control of the bend. For example, U.S. Pat. No. 5,030,135 shows a solid tube base with longitudinal, tapering ribs extending outwardly from the base, while U.S. Pat. No. 2,724,736 discloses the use of a coil spring for the same purpose.

Of the above listed patents, only U.S. Pat. No. 5,094,552 addresses the problem of controlling the bending radius in a flexible boot design, but the disclosed design appears to be more complicated than desirable for many applications and does not offer any guidelines for achieving a particular minimum bending radius.

SUMMARY OF THE INVENTION

In order to meet the requirements of flexibility under small loads while controlling the minimum bend radius and therefore minimize performance loss during excessive side loading conditions with a simple and easily manufactured structure, the invention provides a strain relief boot suitable for use in optical fiber connection assemblies which is capable of precisely controlling the movement of the cable by defining both the point of origin of the bend as well as the specific contour of the bend, and a method of constructing such a boot.

In a preferred embodiment of the invention, the boot includes gimballed ribs having a thickness and spacing which ensures that a minimum bend radius will never be exceeded during the specified loading conditions. According to an especially preferred configuration, the minimum bending radius R is limited by the rib thickness (W), spacing (t) and pivot angle $\phi$ according to the following formula:

$$R = [(W+t)^2 / 2(1 - \cos \phi)]^{\frac{1}{2}}$$

with the material for the boot being chosen for a blend of tensile flexibility to allow bending under loading, and compressive rigidity to maintain form once the minimum bending radius has been reached. As a result, the preferred strain relief boot effectively controls the contour of the cable during side loading, and forms the basis for a strain relief system that can be further supplemented to achieve performance criteria.

These supplements include the provision of a boot attachment system that securely holds the new boot in place while still allowing it to move radially and assist in the strain relief performance through the use of a tab-and-slot configuration for attachment of the boot to the connector combined with a specific spacing between the boot internal diameter and the crimp ferrule of the connector.

Conventional crimp ferrules do not allow the cable to shift sufficiently during loading, and have sharp edges which distort the fiber when it is bent across the edge. The preferred optical cable strain relief arrangement thus includes an improved crimp ferrule having a chamfer on the back end, thereby reducing the binding effect on the fiber while still retaining the cable jacket, and also eliminating the sharp-edge effect seen on standard crimp ferrules.

BRIEF DESCRIPTION OF THE DRAWINGS

FIG. 2 is an elevated side view of a preferred strain relief boot for the connector of FIG. 1.

FIG. 3 is a cross-sectional end view taken along line A—A of FIG. 2.

FIG. 4 is a cross-sectional end view taken along line B—B of FIG. 2.

FIG. 5 is an elevated end view of the strain relief boot shown in FIGS. 1–4.

FIG. 6 is a cross-sectional side view taken along line C—C of FIG. 5.

DETAILED DESCRIPTION OF THE PREFERRED EMBODIMENTS

Figure 1:
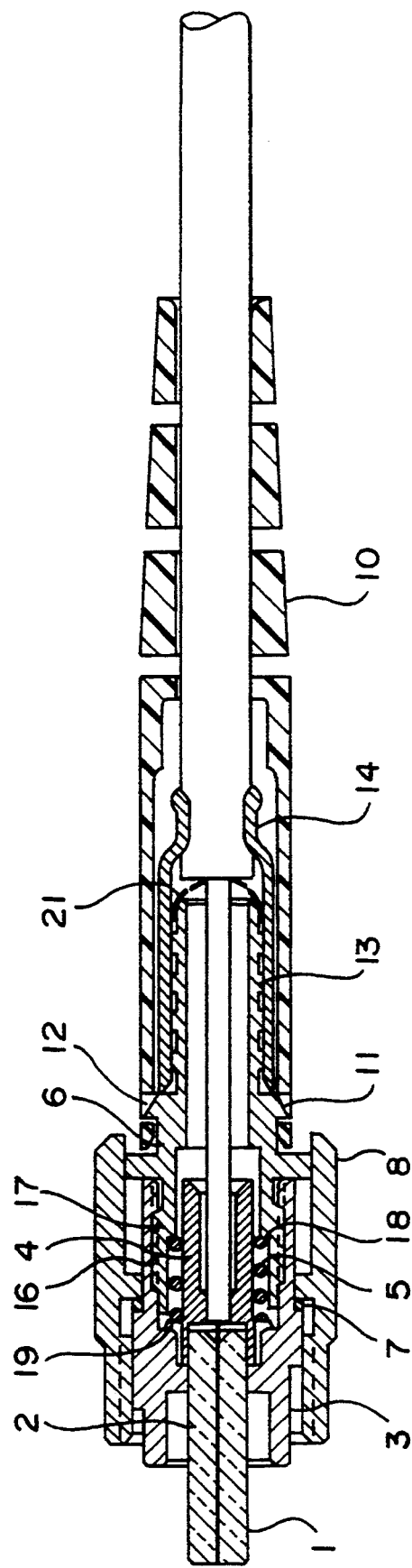
FIG. 1 is a cross-sectional side view of an optical fiber connector constructed in accordance with principles of a preferred embodiment of the invention.

FIG. 1 is a side elevation of an optical fiber connector which embodies the principles of a preferred embodiment of the invention. It is to be understood that certain features of the illustrated connector form no part of the present invention and thus may be freely modified by those skilled in the art, except as indicated below. These features include a ceramic fiber alignment ferrule 1 in which the fiber 2 is inserted to be axially aligned with a second fiber-containing ferrule (not shown) by an alignment sleeve (also not shown) which fits around the ferrules to be aligned; a main body 3; a ferrule holding member 4 for positioning the alignment ferrule 1; a bias spring 5 extending between holder 4 and a rear cable attachment body member 6 threaded into front body 3 to bias the alignment ferrule against the corresponding ferrule upon mating, and a washer 7 and coupling nut 8 rotatably secured to front body 1.

Figure 10:
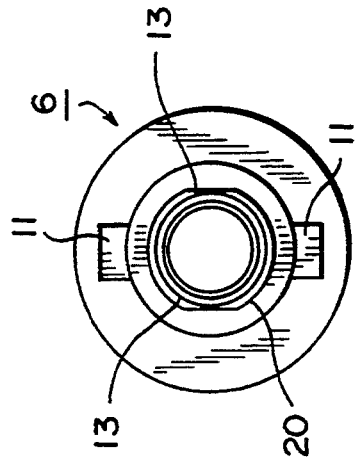
FIG. 10 is an end elevation of the connector rear member of FIGS. 1 and 9.
Figure 11:
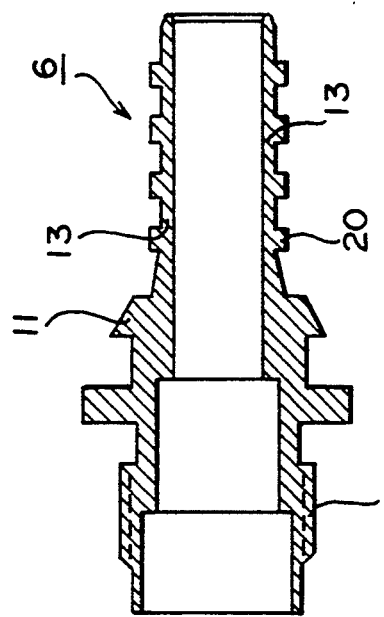
FIG. 11 is a cross-sectional side view of the connector rear member of FIGS. 1, 9, and 10.
Figure 12:
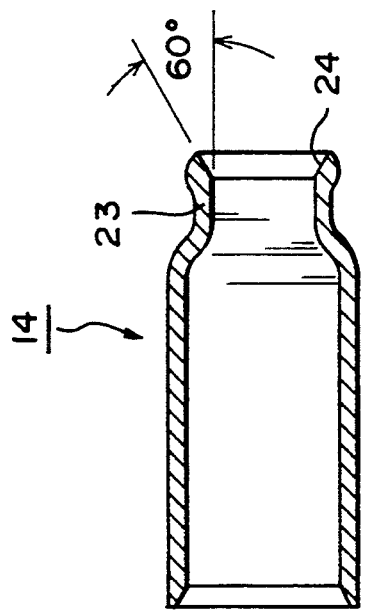
FIG. 12 is a cross-sectional view of the crimp ferrule shown in FIG. 1.

The preferred boot 10 is illustrated in detail in FIGS. 2-8. Attachment boot 10 to the connector is accomplished by means of a tapered tab or projection 11 on rear body member 6, details of which are shown in FIGS. 9-11. Boot 10 includes notches or openings 12 into which tabs or projections 11 extend to secure the boot to the connector when the boot is fitted over a crimp ferrule 14 which in turn is fitted over and secured to cylindrical rear portion 13 of the rear body. Tabs or projections 11 are tapered such that the leading edge 15 of boot 10, which may also be tapered, is caused to flex outwardly as the boot is fitted over the rear body member 6 until the projections reach and enter openings 12, at which point boot 10 restores to its original shape and is held in place by engagement between the projections and edges of the openings 12, the boot 10 thus being assembled to the connector by a simple snap-fit type action.

The rear cable attachment body member 6 also includes, optionally for purposes of the present invention, front externally threaded portion 16 into which a corresponding internally threaded portion 17 of the main body is secured, with bias spring 5 captured between a shoulder 18 of the threaded portion 17 and a flange 19 on holder 4. The cylindrical rear portion 13 of rear body 6 includes circumferential ribs 20 which serve to secure at least a portion 21 of the fiber insulation or shielding against axial forces when crimped within crimp ferrule 14. An outer diameter portion 22 of the cable jacket is further secured by a reduced diameter portion 23 of the crimp ferrule 14.

Advantageously, in the preferred embodiment, the inside surface of the rearwardmost section of the reduced diameter portion 23 of crimp ferrule 14 which engages cable outer jacket portion 21 has a taper 24 of, for example, 60° to allow the fiber to shift during side loading by reducing the binding effect on the fibers while still retaining the cable jacket, and also to eliminate the sharp-edge effect seen on standard crimp ferrules used in conventional optical fiber connectors.

The material of boot 10 is preferably selected for tensile flexibility to allow bending under loading and compressive rigidity to maintain form once the minimum bend radius is achieved, as will become clear from the following description. One suitable material is polypropylene, although those skilled in the art will appreciate that other materials may also have suitable properties of tensile flexibility and compressive rigidity.

Figure 7:
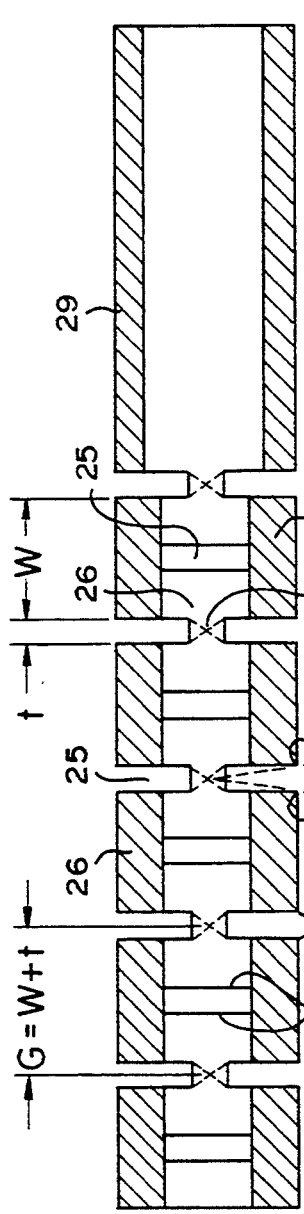
FIG. 7 is a schematic diagram illustrating the relationship between rib thickness W, rib spacing t, and pivot angle $\phi$ in the strain relief boot shown in FIGS. 1-6.
Figure 8:
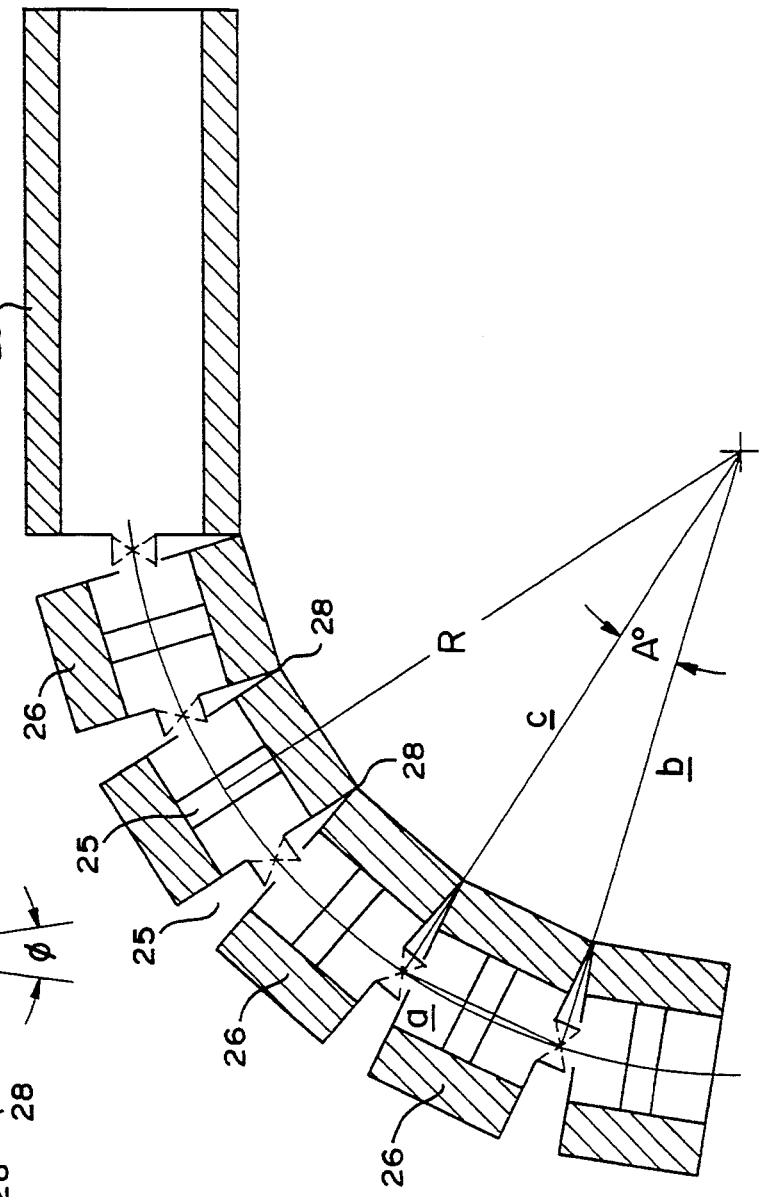
FIG. 8 is a schematic diagram showing the relationship between minimum bending radius R and the rib dimensions for the strain relief boot of FIGS. 1-6.
Figure 9:
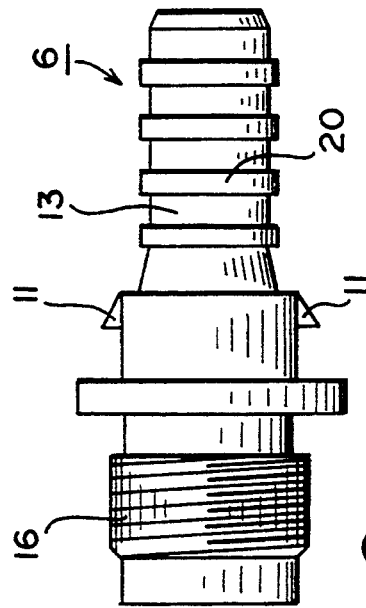
FIG. 9 is a side elevation of a rear cable attachment member the connector shown in FIG. 1.

As shown in detail in FIGS. 2-6, and schematically in FIGS. 7 and 8, boot 10 includes an axially aligned cylindrical bore which extends through the strain relief boot and is sized to accommodate the outer diameter of the fiber optic cable. An overlapping, alternately positioned, staggered series of cut openings 25 of width t, alternate ones of which define a series of ribs 26 each including a transverse opening 25, alternate ribs being bendable in transverse directions. The ribs 26 have a thickness W in the axial direction and are spaced apart by connecting portions 27 of width t also defined by openings 25. The intersection of the axis of the boot with bisectors of the openings 25 and connecting portions 27 form pivot points, the boot being permitted to pivot about the pivot points through an angle $\phi$ having a vertex at the pivots and intersecting outer corners 28 of the ribs, as shown in FIG. 7. Openings 12 for securing the boot to the connector by engagement with projections 11 are located at an opposite end of the boot 10, on generally right cylindrical front section 29 of sufficient length to include crimp ferrule 14, the inner diameter of the boot in this section being sufficiently large to clear the crimp ferrule in order to allow relative movement between the boot and the ferrule, while the inner diameter of at least the ribbed rear section 29 of the boot 10 is reduced to match the cable jacket outer diameter. The outer diameter of section 29 may taper inwardly from front to rear, as will be explained below, but the taper is not necessary to achieve the advantages listed above.

As illustrated in FIG. 8, when the boot 10 is bent under a side load such that the adjacent ribs 25 effectively pivot through an angle $\phi$, the arc through the pivot points will have a minimum radius R. The vertex of the triangle formed by the center of the arc at radius R and adjacent pivot points about which the boot is constrained to move has sides b and c, equal in length to radius R, and a base a equal to the sum of W and t. Since angle A is equivalent to angle $\phi$, the law of cosines provides that $a^2 = b^2 + c^2 - 2bc \cos A$, which reduces to $(W+t)^2 = 2^2 - 2R^2 \cos \phi$, and thus $$R = [(W+t)^2/2(1-\cos \phi,)]^{1/2}.$$

For a tapered boot, the equation needs to be modified in that $\phi$ will be different for each rib. Consequently, the dimensions to obtain a given minimum radius R will need to be recalculated for each rib, which can easily be accomplished for example on a conventional computer aided design (CAD) system.

In either the tapered or right cylindrical version of the preferred boot, those skilled in the art will appreciate that a unique method is employed for the purpose of designing and constructing the boot, the desired bending radius being selected before the dimensions W, t, and $\phi$, are calculated and a boot having those dimensions is constructed.

As indicated above, the preferred boot may be used with a variety of optical connectors other than the illustrated connector. In addition, it will be appreciated by those skilled in the art that the preferred boot may be used in cable connector applications other than fiber optic connectors where an easily controlled minimum bending radius is desired. It is therefore intended that the invention not necessarily be limited to the above-described embodiment, but rather that it be construed to include all modifications and variations covered by the appended claims.

I claim:

1. An optical fiber connector, comprising:
a boot which includes:
a generally cylindrical main section having a principal longitudinal axis;
a plurality of ribs in the generally cylindrical section, said ribs having a width W in the direction of the longitudinal axis defined by a plurality of cuts having a width t in the direction of the longitudinal axis;
said boot being bendable through an angle $\phi$ about pivot points defined by respective intersections of the longitudinal axis with bisectors of said cuts such that as said boot is bent, edges of said ribs engage each other,
wherein dimensions W, t, and $\phi$, are selected to provide a predetermined minimum bending radius; and
means including a connector member and a crimp ferrule between which an optical fiber jacket portion is secured.

2. A connector as claimed in claim 1, wherein said ferrule is generally in the form of a right cylinder, an end of said ferrule facing away from said connector member having an inner chamfered surface for permitting the jacket to pivot about the chamfered edge of the ferrule without damage.

3. A connector as claimed in claim 1, wherein said cuts are staggered such that alternate cuts are transversely oriented to form a gimbal arrangement.

4. A connector as claimed in claim 3, wherein said ribs are annular in shape and said pivot points are located on connecting portions of width t extending between the ribs, alternate connecting portions extending parallel to a longitudinal axis of the optical fiber, the connecting portions on axially opposite sides of the ribs being offset by an angle of 90° relative to a circumference of said ribs to form said gimbal arrangement.

5. A connector as claimed in claim 1, wherein W, t and $\phi$ are related by the following formula:

$$R = [(W+t)^2/2(1-\cos\phi)]^{\frac{1}{2}}.$$

where R is said predetermined minimum bending radius.

6. A connector as claimed in claim 1, further a tab on said connector member and means on said boot for defining a slot which receives said to secure said boot to the connector.

7. A connector as claimed in claim 6, wherein said connector member further includes a cylindrical rear portion extending from a rear body member, said tab being positioned on said rear body member, and wherein a portion of the optical fiber insulation is positioned between said cylindrical rear portion and said crimp ferrule, and a rear portion of said crimp ferrule is crimped onto said optical fiber jacket portion.

8. A connector as claimed in claim 7, wherein said tab is tapered such that a leading edge of the boot is caused to flex outwardly as the boot is fitted over the tab until the tab enters the slot, at which point the boot restores to its original shape and is held in place by engagement between the tab and an edge of the slot.

9. A connector as claimed in claim 1, wherein said boot consists of a boot having tensile flexibility and compressive rigidity.

10. A connector as claimed in claim 1, wherein an inner diameter of a front portion of said boot is sufficiently large to accommodate relative movement between the boot and the crimp ferrule, and wherein an inner diameter of at least a ribbed rear section of the boot is reduced relative to the inner diameter of the front portion to match a cable jacket outer diameter.

11. A connector as claimed in claim 10, wherein an outer diameter of the front section is larger than an outer diameter of the ribbed rear section to form a taper.

12. A connector as claimed in claim 11, wherein said ferrule is generally in the form of a right cylinder, and end of said ferrule facing away from said connector member having an inner chamfered surface for permitting the jacket to pivot about the chamfered edge of the ferrule without damage.

13. A connector as claimed in claim 1, wherein a material of the boot is polypropylene.

14. A connector as claimed in claim 1, wherein said connector member further includes a main body, a ferrule holding member for positioning an alignment ferrule, a bias spring extending between the holding member and a rear cable attachment body member threaded into the front body to bias the alignment ferrule against a corresponding ferrule upon mating, and a washer and coupling nut rotatably secured to the front body to enable coupling of a front body with a complimentary connector.

* * * * *

UNITED STATES PATENT AND TRADEMARK OFFICE
CERTIFICATE OF CORRECTION

PATENT NO.   : 5,390,272
DATED        : February 14, 1995
INVENTOR(S)  : Eric J. Repta et al.

It is certified that error appears in the above-indentified patent and that said Letters Patent is hereby corrected as shown below:

Column 1, line 51, change "No," to --No.--;

Column 3, line 11, after "member" insert --of--;

Column 3, line 39, after "Attachment" insert --of--;

Column 4, line 59, change ")$1^{78}$" to --]$^{\frac{1}{2}}$--

Column 5, line 4, change "∅," to --∅--;

Column 5, line 34, change "∅," to --∅--; and

Column 6, line 8, after "further" insert --comprising--.

Signed and Sealed this

Twenty-ninth Day of August, 1995

Attest:

BRUCE LEHMAN

*Attesting Officer*   *Commissioner of Patents and Trademarks*